United States Patent [19]

Gruber

[11] Patent Number: 4,608,300
[45] Date of Patent: Aug. 26, 1986

[54] FIBRE COMPOSITE MATERIALS IMPREGNATED WITH A CURABLE EPOXIDE RESIN MATRIX

[75] Inventor: Urs Gruber, Arlesheim, Switzerland

[73] Assignee: Ciba-Geigy Corporation, Ardsley, N.Y.

[21] Appl. No.: 619,751

[22] Filed: Jun. 11, 1984

[30] Foreign Application Priority Data

Jun. 21, 1983 [CH] Switzerland ............ 3390/83

[51] Int. Cl.$^4$ .............. B32B 27/26; C08G 59/56; C08G 65/10

[52] U.S. Cl. ............... 428/285; 428/286; 428/290; 428/413; 428/414; 428/417; 528/93; 528/117; 528/118; 528/120; 528/123

[58] Field of Search ............ 428/417, 290, 413, 414, 428/285, 286

[56] References Cited

U.S. PATENT DOCUMENTS

| | | | |
|---|---|---|---|
| 3,321,438 | 5/1967 | Brooker et al. .......... | 528/118 |
| 3,420,794 | 1/1969 | May et al. .............. | 528/93 |
| 3,530,093 | 9/1970 | Maurer ................. | 528/123 |
| 3,575,926 | 4/1971 | Joyce et al. ........... | 528/117 |
| 3,728,302 | 4/1973 | Helm . | |
| 3,801,348 | 4/1974 | Helm . | |
| 3,914,204 | 10/1975 | Helm et al. . | |
| 3,993,707 | 11/1976 | Cummings .............. | 528/121 |
| 4,110,313 | 8/1976 | Schulze et al. ......... | 528/93 |
| 4,296,231 | 10/1981 | Gutekunst et al. . | |
| 4,311,753 | 1/1982 | Pucci .................. | 428/251 |
| 4,316,003 | 2/1982 | Dante et al. ........... | 528/407 |
| 4,324,713 | 4/1982 | Kita et al. ............ | 528/93 |
| 4,349,645 | 9/1982 | Griggs ................. | 528/93 |
| 4,481,349 | 11/1984 | Marten et al. ......... | 528/120 |

FOREIGN PATENT DOCUMENTS 1019925 2/1966 United Kingdom .

OTHER PUBLICATIONS

H. Lee and K. Neville, Handbook of Epoxy Resins, McGraw-Hill, 1967, 9–1 to 9–5.

Primary Examiner—James C. Cannon
Attorney, Agent, or Firm—Luther A. R. Hall

[57] ABSTRACT

Fibre composite systems, in particular fibre composite laminates, can be prepared advantageously from a fibre composite impregnated with a curable epoxide resin matrix containing:

(a) a liquid epoxide resin or a liquid mixture of epoxide resins, (b) an aliphatic or cycloaliphatic primary monoamine and/or disecondary diamine and (c) a tertiary amine which cures by catalysis or (d) a cycloaliphatic diamine or an aliphatic diamine or polyamine, containing not more than one sterically unhindered primary amino group, by crosslinking and curing the resin matrix below 120° C.

8 Claims, No Drawings

FIBRE COMPOSITE MATERIALS IMPREGNATED WITH A CURABLE EPOXIDE RESIN MATRIX

It is known to use epoxide resin mixtures which have undergone a preliminary reaction and are still curable, i.e. B-stage resins, or so-called advanced, i.e. higher molecular, epoxide resins for the preparation of prepregs which are stable on storage. Resin systems of this type are either solid or highly viscous, so that organic solvents are required in order to impregnate fibre materials with these resins, or the resins have to be applied to the fibre material at an elevated temperature from the melt. In addition, resin systems of this type do not cure until fairly high temperatures are reached, i.e. temperatures above 120° C.

It is also known from German Auslegeschrift No. 2,131,929 to prepare prepregs by using reaction products formed from aromatic polyglycidyl ethers and a mixture of monoamines and diamines as the resin, and using dicyandiamide as the curing agent. Temperatures above 120° C. are also required for curing this resin system.

It has now been found that the disadvantages mentioned can be avoided if fibre materials are impregnated with a curable, liquid, solvent-free epoxide resin or mixture of epoxide resins containing, as the curing agent, a specific mixture of amines based on monoamines, and if the fibre materials are dried. Although the prepregs obtained in this manner have only a limited stability on storage, they can be fully cured to give valuable moulded materials below 120° C. and are therefore advantageously suitable for processing together with other materials which stand up to temperatures above 120° C. with difficulty, such as wood or certain plastics.

The present invention relates, therefore, to a fibre composite impregnated with a curable, solvent-free epoxide resin matrix containing (a) a liquid epoxide resin or a liquid mixture of epoxide resins, (b) an aliphatic or cycloaliphatic primary monoamine and/or disecondary diamine and (c) a tertiary amine which cures by catalysis or (d) a cycloaliphatic diamine or an aliphatic diamine or polyamine containing not more than one sterically unhindered primary amino group, there being present in the curable epoxide resin matrix, for 1 epoxide equivalent of the epoxide resin (a), 0.15 to 0.8 amine hydrogen equivalent of the amine component (b) and 0.01 to 0.1 mole of the tertiary amine (c) or 0.85 to 0.2 amine hydrogen equivalent of the amine component (d), and the sum of the amine hydrogen equivalents from (b) and (d) being 0.85 to 1.2 for 1 epoxide equivalent.

Preferably, there are present in the curable epoxide resin matrix which is suitable for impregnating, 0.2 to 0.7 amine hydrogen equivalent of the amine component (b) and 0.02 to 0.06 mole of the tertiary amine (c) or 0.7 to 0.15 amine hydrogen equivalent of the amine component (d) for 1 epoxide equivalent, and the sum of the amine hydrogen equivalents of (b) and (d) is 0.9 to 1.1 for 1 epoxide equivalent.

In a preferred embodiment, the fibre composite is impregnated with an epoxide resin matrix consisting of the components (a), (b) and (c), the component (b) being, in particular, a primary monoamine.

Examples of suitable components (a) are the liquid epoxide resins based on bisphenol A or F or based on phenol novolaks and mixtures thereof in all proportions. They can be mixed with a reactive diluent, for example phenyl or cresyl glycidyl ether, butanediol diglycidyl ether or diglycidyl hexahydrophthalate, preferably in an amount of 3–50% by weight, based on the total amount of epoxide resins, or with diglycidylaniline, preferably in an amount of 3–20% by weight, based on the total amount of epoxide resins. Furthermore, triglycidyl-p-aminophenol and tetraglycidyl-p,p'-diaminodiphenylmethane which can be mixed with butanediol diglycide or diglycidylaniline, are also suitable mixtures of epoxide resins.

The epoxide compounds mentioned can also be employed in desired mixtures with one another or with solid epoxide resins which are soluble in the epoxide resin mixture, provided that the viscosity of the final mixture is less than 4,000 mPa.s, preferably less than 1,500 mPa.s, at room temperature.

Examples of suitable primary monoamines are benzylamine, cyclohexylamine, ethanolamine, 2-ethylhexylamine, 2-phenylethylamine, 3-(2-ethylhexoxy)-propylamine, n-octylamine, 2-butoxyethylamine, 2-(2-hydroxyethoxy)-ethylamine, 3-isopropoxypropylamine or 3-amino-2,2-dimethylpropan-1-ol.

Examples of suitable disecondary diamines (b) are piperazine, N,N'-dicyclohexylhexamethylene-1,6-diamine or N,N'-bis-(-cyanoethyl)-hexamethylene-1,6-diamine. The primary monoamines and disecondary diamines mentioned are known compounds and are for the most part commercially available.

The tertiary amines (c), which are employed as curing agents exerting a catalytic action, are also known, and in some cases commercially available, curing agents for epoxide resins. Curing agents of this type are described, for example, by H. Lee and K. Neville in the "Handbook of Epoxy Resins", 1967, chapter 9. As well as the compounds mentioned in this reference, it is also possible to use the imidazole compounds disclosed in European Patent No. A 1 0,018,949 or the known imidazole compounds of the formulae

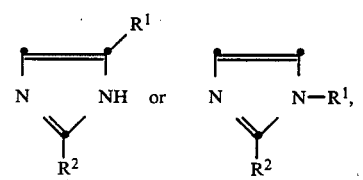

in which $R^1$ and $R^2$ independently of one another are each an H atom, methyl, ethyl or phenyl. The imidazole compounds of the formulae indicated are preferred catalytic curing agents.

Suitable cycloaliphatic diamines (d) are both diamines in which the primary amino group is linked directly to the cycloaliphatic ring, for example 1,2-diaminocyclohexane or bis-(p-aminocyclohexyl)-methane, and diamines in which the amino group is linked to the cycloaliphatic ring via a methylene group, for example 3-aminomethyl-3,5,5-trimethylcyclohexylamine or 1,3-bis-(aminomethyl)-cyclohexane.

The aliphatic diamines or polyamines (d) containing not more than one sterically unhindered primary amino group thus contain only one free amino group, or none at all, in the molecule. The remaining amino groups are either substituted or are sterically hindered. The following may be mentioned as examples of such diamines and polyamines (d): N,N-dimethylaminopropylamine, N,N-diethylaminopropylamine, 1-N,N-dimethylaminopropyl-1,3-diaminopropane, 1-N,N-dimethylamino-3-(β-cyanoethylamino)-propane, 2,5-diamino-2,5-dimethyl-n-hexane, 2,11-diamino-2,11-dimethyl-n-dodecane and 1,10-diamino-2,2,12-trimethyl-n-tridecane.

If the amines (d) contain a tertiary amino group in the molecule, the amount of amine hydrogen equivalents required for curing the epoxide resin (a) can be reduced. In accordance with the invention, the amine hydrogen equivalents per tertiary amino group in the molecule which are still required for (d) are reduced to not more than $\frac{1}{3}$.

The customary fibres used in fibre-reinforcing materials can be employed as reinforcing fibres for the fibre composite according to the invention. These fibres can be organic or inorganic fibres or natural or synthetic fibres and can be in the form of woven or laid fabrics, non-wovens or mats and in the form of rovings, staple fibres or continuous filaments. Examples of reinforcing fibres used are glass, asbestos, boron, carbon or metal fibres and aramide fibres, high-tenacity polyester fibres or natural fibres composed of cotton or staple rayon. Such fibres and fabrics made from them are available commercially.

These fibres or fabrics can be coated with the solvent-free epoxide resin mixture by the customary methods of impregnation, by brushing, spraying or dipping, by means of the strand drawing technique or, in the case of continuous filaments, by the precision filament winding process.

The fibre materials which have been coated with the matrix resin can be dried at room temperature in the air, the matrix resin being gradually converted into the still fusable and curable B-stage and so-called prepregs being obtained. Since the matrix resin used for impregnation is solvent-free, it is also possible to omit, before final curing, the process stage for the complete removal of solvent from the fibre composite; this stage is necessary in order that pores or holes are not formed in the cured composite material by the evaporation of residual solvent.

The preparation of prepregs from the fibre composite according to the invention is therefore associated with the advantage that the corresponding process stages are not required, either for evaporating the solvent or for so-called advancement of the resin, and no expenditure on heat energy is required.

The fibre composite according to the invention is preferably in the form of prepregs which can be used in a known manner for the preparation of laminates.

The prepregs according to the invention can be completely cured at temperatures below 120° C. and are therefore advantageously suitable for the preparation of fibre composite systems containing other materials, particularly those which stand up poorly to temperatures above 120° C., such as wood or plastics having a low softening point, for example ABS polymers, polyethylene or PVC.

The present invention also relates, therefore, to a fibre composite system, particularly a fibre composite laminate, which is obtained from the fibre laminate according to the invention, if appropriate together with other materials, by shaping and crosslinking the resin matrix.

The resin exudation described in the examples which follow is determined as follows: 2 square pieces of prepreg, the sides being, for example, 5 cm long, are weighed (=G 1), laid exactly on top of one another and then placed between 2 pieces of release paper or film in a press which has been preheated to 100° C. The press is immediately closed and raised to a pressure of 2 mPa. The laminate thus formed is taken out of the hot press after 5 minutes and the resin which has exuded along the edge of the laminate is cut off. The laminate is weighed again (=G 2). The difference in weight between G 1 and G 2, expressed as a %, gives the "flow".

The usability of a prepreg is usually determined on the basis of its flow. If the flow is too low, for example less than 10%, it is generally no longer possible to compress a prepreg to give a good laminate.

The glass transition temperature ($T_G$) is determined on a TMA 40 thermomechanical analyser made by Mettler AG. The load on the penetrating ram is 0.5 N/mm$^2$ and the heating rate is 10° C./minute. The instrument determines the $T_G$ completely automatically.

In the following examples, amine hydrogen equivalent is abbreviated to: N—H-equivalent.

EXAMPLE 1

An epoxide resin/curing agent mixture is prepared at room temperature (RT) in a beaker from: 200 g of an epoxide resin based on bisphenol A having an epoxide content of 5.4 equivalents/kg, 40 g of technical benzylamine (0.70 N—H-equivalent/epoxide equivalent) and 4 g of N-methylimidazole (0.045 mole/epoxide equivalent).

This mixture has a viscosity of 260 mPa.s at 25° C., which is advantageously low for impregnating fine glass or carbon fibre fabrics, and a long pot life of 6 hours (hr). A unidirectional glass fabric (Interglas 92146 made by Interglas-Textil) is impregnated with this mixture on polyethylene film and is then covered with a further piece of film. Several such impregnated glass fabrics are allowed to stand at RT, the initially moist prepreg becoming dry in the course of 16–20 hr. and having a resin content of approximately 40% by weight. In order to determine the stability of these prepregs on storage, the gel time at 100° C. is determined every day on a hotplate. Furthermore, laminates are prepared from 12 layers of such prepregs in a press at 100° C., 0.02 mPa and a press dwell of 20 minutes, and their interlaminar shear strength (ILS) is measured on a short bending beam by the method of ASTM-D-2344.

| Storage time at RT days | Gel time at 100° C. minutes | Resin exudation % | ILS MPa | Glass content % by weight | $T_G$ °C. |
|---|---|---|---|---|---|
| 0 | 11 | — | — | — | 83 |
| 0.75 | 3.5 | — | 53.2 | 74.6 | |
| 2 | — | — | 51.7 | 70.0 | |
| 3 | 2 | 18.4 | — | — | |
| 5 | 1.8 | 17.2 | 49.2 | 65.8 | |
| 7 | 1.35 | 12 | 47.6 | 60.5 | |

The prepregs can still be processed after being stored at RT for up to 7 days.

EXAMPLE 2

The procedure is as in Example 1, employing a mixture composed of: 100 g of epoxide resin according to Example 1, 10 g of technical benzylamine (0.35 N—H-equivalent/epoxide equivalent) and 2 g of N- methylimidazole (0.045 mole/epoxide equivalent). Since this mixture contains, by comparison, less benzylamine, it has a higher viscosity (870 mPa.s at 25° C.) but has instead a pot life extended to 8 hr. and a higher glass transition temperature ($T_G$):

|  | $T_G$ |
|---|---|
| after curing for 20 minutes at 100° C.: | 87° C. |
| 60 minutes at 100° C.: | 110° C. |

Prepregs and laminates are prepared analogously to Example 1 and their ILS is determined.

| Storage time at RT | ILS after 20 minutes at 100° C. | Glass content |
|---|---|---|
| 0 days | 52.6 MPa | 78.8% |
| 2 days | 53.6 MPa | 70.2% |
| 5 days | 50.4 MPa | 59.4% |

EXAMPLES 3–9

The benzylamine in Examples 1 and 2 is replaced by other primary monoamines.

| Example | | 3 | 4 | 5 | 6 | 7 | 8 | 9 |
|---|---|---|---|---|---|---|---|---|
| Epoxide resin | (g) | 100 | 100 | 100 | 100 | 100 | 100 | 100 |
| n-Octylamine | (g) | 15 | | | | | | |
| (N—H—equivalent/epoxide equivalent) | | (0.43) | | | | | | |
| 2-Phenylethylamine | (g) | | 15 | 15 | 15 | | | |
| (N—H—equivalent/epoxide equivalent) | | | (0.46) | | | | | |
| 3-(2-Ethylhexoxy)-propylamine | (g) | | | | | 20 | | 7 |
| (N—H—equivalent/epoxide equivalent) | | | | | | (0.40) | | (0.14) |
| 2-(2-Aminoethoxy)-ethanol | (g) | | | | | | 20 | 13 |
| (N—H—equivalent/epoxide equivalent) | | | | | | | (0.71) | (0.46) |
| 2-Phenylimidazole | (g) | | | 2 | | | | |
| (Mole/epoxide equivalent) | | | | (0.026) | | | | |
| N—Methylimidazole | (g) | | | | 2 | 2 | 2 | 2 |
| (Mole/epoxide equivalent) | | | | | (0.046) | | | |
| Storage at RT | | | | Gel time at 100° C. (minutes) | | | | |
| 0 days | | >70 | >70 | 20 | 11 | 14.5 | 6 | 6 |
| 1 day | | | | 12 | 2.75 | 5 | 1.5 | 1.5 |
| 4 days | | | | 2.25 | 0.7 | (1) | (1) | (1) |
| 5 days | | | | 1.8 | | | | |
| 6 days | | | | 1.5 | 0.25 | | | |
| 7 days | | >70(2) | >70(2) | | | | | |
| Prepreg dry after: | (hr.) | 15 | 15 | 20 | <20 | <20 | <20 | <20 |
| Stability on storage: | (days) | >>7 | >>7 | 6 | 3 | 3 | 2 | 2 |

(1)gelled
(2)not gelled

EXAMPLE 10

The procedure is as in Example 1, employing a mixture composed of: 100 g of epoxide resin based on bisphenol A and having an epoxide content of 5.3 equivalents/kg, 29.4 g of N,N'-bis-(2'-cyanoethyl)-1,6-diaminohexane (0.50 N—H-equivalent/epoxide equivalent) and 7.6 g of 1,2-diaminocyclohexane (0.50 N—H-equivalent/epoxide equivalent) to impregnate the glass fabric, and preparing a slightly tacky, flexible prepreg by carrying out preliminary reaction in a circulating air oven at 130° C. for 6 minutes.

| Storage time at 10° C. | Test of stability on storage | | |
|---|---|---|---|
| | Flexibility | Tackiness | Resin exudation (%) |
| 0 days | good | slight | 31–34 |
| 3 days | good | little | 15.5 |
| 4 days | good | little | 22.3 |
| 5 days | good | very little | 6.6 |
| 6 days | good | very little | 6.3 |
| 7 days | good | dry | 0.7 |

This prepreg can be stored satisfactorily for more than 4 days.

EXAMPLE 11

A mixture composed of: 100 g of epoxide resin based on bisphenol A and having 5.3 epoxide equivalents/kg, 15 g of benzylamine (0.52 N—H-equivalent/epoxide equivalent) and 2 g of 2-ethylimidazole (0.04 mole/epoxide equivalent) is employed in order to prepare prepregs in the B-stage, i.e. the state of the prepreg in which it is no longer moist, but preferably dry or, at best, still slightly tacky, by heating briefly to a particular temperature.

The 2-ethylimidazole is first dissolved in the benzylamine at 40°–50° C. and is then stirred into the epoxide resin at RT, the mixture having a viscosity of 640 mPa.s at 25° C. and a pot life (Tecam, 23° C.) of 3.5 hr.

Glass fabrics "Interglas grade 92146" are impregnated with this mixture and are allowed to undergo preliminary reaction in a circulating air oven until they have reached the desired B-stage. Laminates composed of 12 prepreg layers are then compressed for 20 minutes at 100° C.

| Drying conditions 180 seconds | at °C. | A | B |
|---|---|---|---|
| | | 129–132 | 128–130 |
| Appearance of prepregs | at 20° C. | colourless, dry, flexible | colourless, slightly tacky, flexible |
| Storage time of prepregs | at 5–10° C. (days) | 3 | 43 |
| Appearance after storage | | flexible | brittle |
| Gel time | | 4 | |
| ILS | (mPa) | 47.5 | 47 |

-continued

| Drying conditions 180 seconds | at °C. | A 129-132 | B 128-130 |
|---|---|---|---|
| Glass content | (%) | 77.2 | 75 |

The tensile and shear strength (TSS) is also determined on the B prepreg, as a function of the storage time of the prepregs in a refrigerator. This is effected by bonding 2 strips of aluminium sheet (Anticorrodal® 100) 25 mm wide and 1.5 mm thick by means of a piece of prepreg, with an overlap of 12.5 mm. Curing: 20 minutes at 100° C.; tested as specified in DIN 53,283.

| Storage time of prepregs at 10° C. (days) | TSS (mPa) |
|---|---|
| 0 | 8.0 ± 2.5 |
| 7 | 10.0 ± 2.5 |
| 20 | 8.5 ± 2.6 |

EXAMPLES 12–14

The procedure is as in the preceding examples. In each case 100 g of a medium viscosity epoxide resin based on bisphenol A and containing 5.3 epoxide equivalents/kg are used.

| Example | | 12 | 13 | 14 |
|---|---|---|---|---|
| Benzylamine | (g) | 10 | 15 | 10 |
| (N—H—equivalent/epoxide equivalent) | | 0.35 | 0.53 | 0.35 |
| 1,2-Diaminocyclohexane | (g) | 2.5 | | |
| (N—H—equivalent/epoxide equivalent) | | 0.165 | | |
| 1-N,N—Dimethylaminopropyl-1,3-diaminopropane | (g) | | 0.6 | |
| (N—H—equivalent/epoxide equivalent) | | | 0.02 | |
| 1-N,N—Dimethylamino-3-(β-cyano-ethylamino)-propane | (g) | 2.5 | 1.4 | |
| (N—H—equivalent/epoxide equivalent) | | 0.03 | 0.02 | |
| 1,3-bis-(Aminomethyl)-cyclohexane | (g) | | | 12 |
| (N—H—equivalent/epoxide equivalent) | | | | 0.64 |
| Storage time at RT | | Gel time at 100° C., minutes | | |
| 0 days | | 7 | 8.5 | 4.5 |
| 2 days | | 1 | 2.25 | |
| 7 days | | 0.5 | 1.5 | |
| 23 days | | | | |
| Preparation of the prepregs | | Glass fabric "Interglas 91745" | | |
| Oven temperature | °C. | 128–133 | 130–132 | 100 |
| Preliminary reaction time | minutes | 2.5 | 2.5 | 3 |
| Storage time at 10° C. | | Flexibility (1 = very flexible, 4 = stiff) | | |
| 0 days | | 1 | 1 | 2 |
| 1 day | | 1 | 1–2 | 2–3 |
| 6 days | | 3 | 2–3 | 4 |
| Stability on storage under refrigeration | (days) | 4 | 5 | 6* |

*By virtue of the resin exudation still being 12%.

EXAMPLE 15

An amine mixture composed of 15 g of benzylamine (0.53 N—H-equivalent/epoxide equivalent) and 3 g of 2,4,6-tris-(dimethylaminomethyl)-phenol (0.021 mole/epoxide equivalent) is added to 100 g of an epoxide resin based on bisphenol A and having an epoxide content of 5.3 equivalents/kg, and the components are mixed with one another until the mixture is free from streaks. This resin mixture is used firstly to charge small aluminium pans of 5 cm diameter with 4 g in each case, and secondly to impregnate pieces of glass fabric (Interglas fabric 92146 made by Interglas-Textil GmbH/DE).

The resin mixtures in the small aluminium pans are stored in a desiccator over silica gel at room temperature (RT). The gel times at 100° C. of these resin mixtures are determined periodically.

The impregnated glass fabrics are also stored at RT between two pieces of polyethylene film. The flow at 100° C. of these pieces of prepreg is determined.

The resin mixture which has been cured for 30 minutes at 100° C. has a $T_G$ value of 86° C. A laminate prepared analogously to Example 11, using two strips of aluminium sheet and the impregnated pieces of glass fabric, is cured for 30 minutes at 100° C. and has a TSS of 13.6 mPa.

| Storage time at RT (days) | Gel time of mixtures at 100° C. ('minutes, "seconds) | Resin exudation of prepregs at 100° C. (%) | ILS (mPa) |
|---|---|---|---|
| 0 | 9'53" | | |
| 1 | 3'42" | 16 | 56.3 |
| 2 | 3'22" | 19.5 | |
| 4 | 3'14" | 13.7 | |
| 5 | 3'06" | | |
| 8 | 2'49" | | |
| 12 | ~1' | | 9.8 |

EXAMPLES 16 AND 17

Prepregs and laminates are prepared analogously to Example 15, now employing cyclohexylamine and 2-ethylimidazole instead of the amine mixture.

| Example | | 16 | 17 |
|---|---|---|---|
| Epoxide resin | (g) | 100 | 100 |
| Cyclohexylamine | (g) | 9.2 | 14 |
| (N—H—equivalent/epoxide equivalent) | | (0.36) | (0.53) |
| 2-Ethylimidazole | (g) | 2.6 | 2.3 |

-continued

| Example | | 16 | 17 |
|---|---|---|---|
| (mole/epoxide equivalent) | | (0.051) | (0.054) |
| Viscosity of the mixture at 25° C. | (mPa · s) | 1820 | 900 |
| Pot life (TECAM*) | (minutes) | 326 | 292 |
| Storage time at RT (over silica gel) | | Gel time at 100° C. (minutes, seconds) | |
| 0 days | | 12'06" | 13'45" |
| 1 day | | 7'30" | 9'00" |
| 5 days | | 2'38" | 4'23" |
| 10 days | | 2'00" | 4'01" |
| T$_G$ (TMA 40) after storage at RT for 1 day, | | | |
| Curing: 20 minutes at 100° C. | (°C.) | 121 | 114 |
| Curing: 60 minutes at 100° C. | (°C.) | 124 | 118 |
| Prepregs prepared with glass fabric (92146) | | | |
| Impregnation at RT | | excellent | |
| B-stage (dry to the touch) at RT after | (hours) | | 25–27 |
| Resin content | (%) | | 38 |
| Resin exudation at 100° C. after | | | |
| Storage at RT for 1 day | (%) | | 26 |
| Storage at RT for 5 days | (%) | | 23.6 |
| ILS after storage at RT for 1 day and curing for 20 minutes at 100° C.: | | | |
| Glass fibre prepregs | (mPa) | | 51.8 |
| Carbon fibre prepregs | (mPa) | | 20.3 |

*The pot life was determined by the Tecam method as specified in British Standard 3532 (1967), using a TECAM ® Geltimer instrument made by Techma Ltd., Cambridge. This method measures the time until a plunger moving up and down in 100 g of resin/curing agent mixture can no longer move as the result of the composition gelling (initial temperature 23° C.).

What is claimed is:

1. A fibre composite impregnated with a solvent-free epoxide resin matrix curable at a temperature less than 120° C. which contains
   (a) a liquid epoxide resin or a liquid mixture of epoxide resins,
   (b) an aliphatic or cycloaliphatic primary monoamine and/or disecondary diamine and
   (c) a tertiary amine epoxy curing agent or imidazole which cures by catalysis, there being present in the curable epoxide resin matrix, for 1 epoxide equivalent of the epoxide resin (a), 0.15 to 0.8 amine hydrogen equivalent of the amine component (b) and 0.01 to 0.1 mole of the tertiary amine (c).

2. A fibre composite according to claim 1, wherein 0.2 to 0.7 amine hydrogen equivalent of the amine component (b) and 0.02 to 0.06 mole of the tertiary amine (c) are present in the curable epoxide resin matrix for 1 epoxide equivalent.

3. A fibre composite according to either of claims 1 or 2, wherein the component (b) is a primary monoamine.

4. A fibre composite according to either of claims 1 or 3, wherein the component (c) is an imidazole compound.

5. A fibre composite according to claim 1, which is in the form of a prepreg.

6. A fibre composite according to claim 1 wherein the component (b) is a primary monoamine.

7. A fibre composite according to claim 1 wherein the component (c) is an imidazole compound.

8. A fibre composite system, in particular a fibre composite laminate, prepared from the fibre composite according to claim 1 and, if appropriate, other materials, by shaping and crosslinking the resin matrix.

* * * * *